US012646106B2

(12) United States Patent
Rakshit et al.

(10) Patent No.: US 12,646,106 B2
(45) Date of Patent: Jun. 2, 2026

(54) VIRTUAL ENVIRONMENT WITH DYNAMIC BIDDING FOR SERVICES TO PROCESS AN ORDER

(71) Applicant: International Business Machines Corporation, Armonk, NY (US)

(72) Inventors: Sarbajit K. Rakshit, Kolkata (IN); Reji Jose, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 18/482,157

(22) Filed: Oct. 6, 2023

(65) Prior Publication Data

US 2025/0117844 A1     Apr. 10, 2025

(51) Int. Cl.
| | |
|---|---|
| *G06Q 30/00* | (2023.01) |
| *G06Q 10/083* | (2023.01) |
| *G06Q 10/087* | (2023.01) |
| *G06Q 30/0601* | (2023.01) |
| *G06Q 30/08* | (2012.01) |
| *G06T 17/00* | (2006.01) |

(52) U.S. Cl.
CPC ........... *G06Q 30/08* (2013.01); *G06Q 10/083* (2013.01); *G06Q 10/087* (2013.01); *G06Q 30/0643* (2013.01); *G06T 17/00* (2013.01)

(58) Field of Classification Search
CPC ................................................ G06Q 30/06–08
See application file for complete search history.

(56) References Cited

U.S. PATENT DOCUMENTS

| | | | |
|---|---|---|---|
| 10,002,337 | B2 | 6/2018 | Siddique et al. |
| 2002/0035537 | A1 | 3/2002 | Waller et al. |

| | | | | |
|---|---|---|---|---|
| 2015/0186869 | A1 * | 7/2015 | Winters | ............... G06Q 20/322 |
| | | | | 705/26.81 |
| 2017/0039613 | A1 | 2/2017 | Kaehler et al. | |
| 2017/0293886 | A1 * | 10/2017 | Bostick | ............ G06Q 10/08355 |
| 2021/0182779 | A1 * | 6/2021 | Altieri | .................... H04N 23/60 |
| 2021/0365885 | A1 * | 11/2021 | Timonen | ............ G06Q 10/0835 |
| 2023/0118119 | A1 | 4/2023 | Chachek et al. | |

FOREIGN PATENT DOCUMENTS

| | | |
|---|---|---|
| KR | 20220098845 A | 7/2022 |

OTHER PUBLICATIONS

Disclosed Anonymously, "Method and System for Virtual Reality Shopping Environment Creation based on Personalized Health Parameters", ip.com, IPCOM000267958D, Dec. 9, 2021, 3 pages.

\* cited by examiner

*Primary Examiner* — Ethan D Civan

(74) *Attorney, Agent, or Firm* — CHIP LAW GROUP

(57)     ABSTRACT

According to a present invention embodiment, a system for processing an order in a computerized environment identifies an item selected by a user in the computerized environment. The system determines that a provider of the item is unable to provide the item to a delivery location based on one or more conditions. A bidding session is conducted for a plurality of service providers to select one or more service providers with services enabling the item to be provided to the delivery location. A transaction for the item is performed to deliver the item to the delivery location via the provider of the item and the one or more service providers. Embodiments of the present invention further include a method and computer program product for processing an order in a computerized environment in substantially the same manner described above.

14 Claims, 4 Drawing Sheets

VIRTUAL ENVIRONMENT WITH DYNAMIC BIDDING FOR SERVICES TO PROCESS AN ORDER

BACKGROUND

1. Technical Field

Present invention embodiments relate to virtual or computerized environments, and more specifically, to processing an order in a virtual reality (VR) environment utilizing services selected based on dynamic bidding.

2. Discussion of the Related Art

A virtual store may be hosted by a retailer or manufacturer and provide consumers with an ability to shop using virtual reality (VR). In this environment, consumers from around the world may simultaneously shop from the same aisle for the same product in the virtual store by assessing a displayed virtual sample. The product price is displayed differently to the consumers based on their location and the cost of logistic services required to deliver the product to the consumer.

Although inventory available from the retailer or manufacturer is used to fulfill orders placed by the consumers, certain situations may arise during a shopping session due to simultaneous shopping by consumers from various locations. These situations prevent or complicate order fulfillment for the retailer or manufacturer.

SUMMARY

According to one embodiment of the present invention, a system for processing an order in a computerized environment comprises one or more memories, and at least one processor coupled to the one or more memories. The system identifies an item selected by a user in the computerized environment. The system determines that a provider of the item is unable to provide the item to a delivery location based on one or more conditions. A bidding session is conducted for a plurality of service providers to select one or more service providers with services enabling the item to be provided to the delivery location. A transaction for the item is performed to deliver the item to the delivery location via the provider of the item and the one or more service providers. Embodiments of the present invention further include a method and computer program product for processing an order in a computerized environment in substantially the same manner described above.

BRIEF DESCRIPTION OF THE DRAWINGS

Generally, like reference numerals in the various figures are utilized to designate like components.

DETAILED DESCRIPTION

Figure 1:
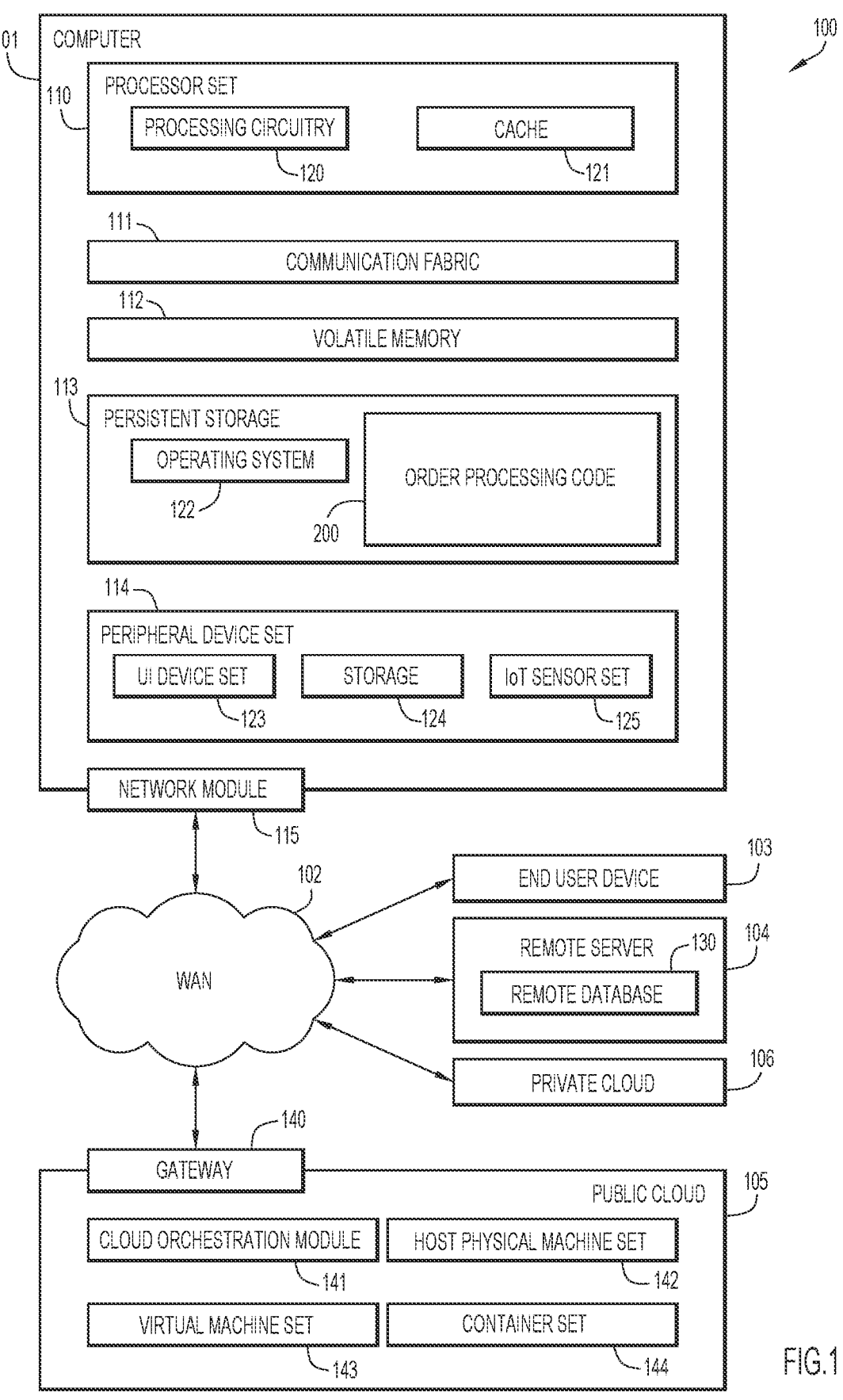
FIG. 1 is a diagrammatic illustration of an example computing environment according to an embodiment of the present invention.

An embodiment of the present invention provides a virtual reality (VR) and artificial intelligence (AI) based system to perform dynamic bidding in order to fulfill consumer orders. The system may be hosted for, or by, an item provider (e.g., retailer, manufacturer, other entity providing goods and/or services, etc.) and onboards bidding service providers onto its platform from locations where the item provider wants to offer or sell items (e.g., products, services, etc.). For example, the system may be hosted on one or more cloud servers in one or more geographical regions that provide the item provider with the ability to span across international borders.

When a consumer starts a shopping session in a virtual reality (VR) store, the VR store identifies the consumer location or address to which products are to be shipped. The system onboards service providers that provide different services for order fulfillment across geographical locations. The services may include product sourcing (e.g., providing the product, etc.), product customization, packing, shipping, delivery, drone-based services, returns processing, etc. The service providers are distinctly onboarded with respect to each of the services.

Once the consumer selects a product to be purchased or adds a product to a virtual cart, the system initiates multiple dynamic bidding sessions with onboarded service providers for the different services (e.g., product sourcing, packing, delivery, etc.) in response to certain conditions. These conditions may include the item provider (e.g., retailer, manufacturer, other entity providing goods and/or services, etc.) does not deliver or operate at the delivery location, the item provider has run out of the product inventory, the overall logistics cost does not satisfy (e.g., exceeds, etc.) a cost threshold determined by the item provider, the carbon footprint incurred while delivering the product is not at sustainable levels, and/or the item provider is not able to meet a delivery time by which the consumer needs the product delivered.

A bidding session is initiated for each service with the respective group of onboarded service providers. The item provider (e.g., retailer, manufacturer, other entity providing goods and/or services, etc.) may choose to keep certain services that it considers as a competitive advantage in its own control to have an edge in the market (e.g., provide the certain services rather than allowing a service provider to perform those services, etc.). For example, the item provider may choose to manage shipping and delivery to maintain confidentiality of the consumer. The system processes winning bids for the various services and determines an overall price for delivering the product to the consumer. The price of the product is dynamically updated in the virtual cart of the virtual reality (VR) store.

An embodiment of the present invention may employ artificial intelligence (AI), virtual reality (VR), and Internet of Things (IoT) devices to identify a lack of inventory in a particular location and initiate multiple dynamic bidding sessions with service providers for services when the inventory for the product is not available from an item provider (e.g., retailer, manufacturer, other entity providing goods and/or services, etc.). For example, when a consumer wants to buy a size-10 shoe during a VR shopping session, and this particular shoe of size-10 is already sold out to other shoppers of a VR environment at about the same time, the present invention embodiment initiates a dynamic bidding session to obtain from the service providers a price for packing, shipping, and delivering the shoe to the consumer.

An embodiment of the present invention may employ artificial intelligence (AI), virtual reality (VR), and Internet of Things (IoT) devices to identify a consumer desired delivery location and initiate multiple dynamic bidding sessions with service providers for services when a consumer requests delivery to a location within which an item provider (e.g., retailer, manufacturer, other entity providing goods and/or services, etc.) does not operate. For example, an item provider may operate in a geographic location and has VR shopping enabled for another geographic location. When a consumer wants to buy a product during a VR session, the item provider initiates a dynamic bidding session with service providers in proximity of the other location in order to obtain a price from the service providers for packing, shipping and delivering the product to the delivery location.

An embodiment of the present invention may employ artificial intelligence (AI), virtual reality (VR), and Internet of Things (IoT) devices to identify a consumer desired delivery location and initiate multiple dynamic bidding sessions with service providers for services when the logistics cost to deliver the product does not satisfy (e.g., exceeds, etc.) a cost threshold for an item provider (e.g., retailer, manufacturer, other entity providing goods and/or services, etc.). For example, a consumer may want to buy a product to be delivered to a particular address. The present invention embodiment estimates the cost of packing, shipping and delivering the product by an item provider. When this cost is beyond a particular threshold (e.g., the overall order value is less and the cost to pack and ship this product is too high), the present invention embodiment initiates a dynamic bidding session with service providers in the delivery location.

An embodiment of the present invention may employ artificial intelligence (AI), virtual reality (VR), and Internet of Things (IoT) devices to identify a consumer desired delivery location and initiate multiple dynamic bidding sessions with service providers for services when a carbon footprint to deliver the product does not satisfy (e.g., exceeds, etc.) a carbon emission threshold set by an item provider (e.g., retailer, manufacturer, other entity providing goods and/or services, etc.). For example, when the product shipped by the item provider needs to be shipped as air cargo, or when additional packing is required to protect the product during shipping, the overall carbon emission for this delivery is significantly higher when compared to when the product is shipped locally. In such cases, the present invention embodiment initiates a dynamic bidding session with service providers in proximity of the delivery location.

In an embodiment of the present invention, when during a virtual reality (VR) shopping session, any party wins a bid, the winning party can place an avatar-based helpdesk or other graphical object in the virtual reality (VR) shopping environment so that a consumer can perform interaction or communication with the winning party and obtain appropriate assistance for shopping.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code involved in performing the inventive methods, such as order processing code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
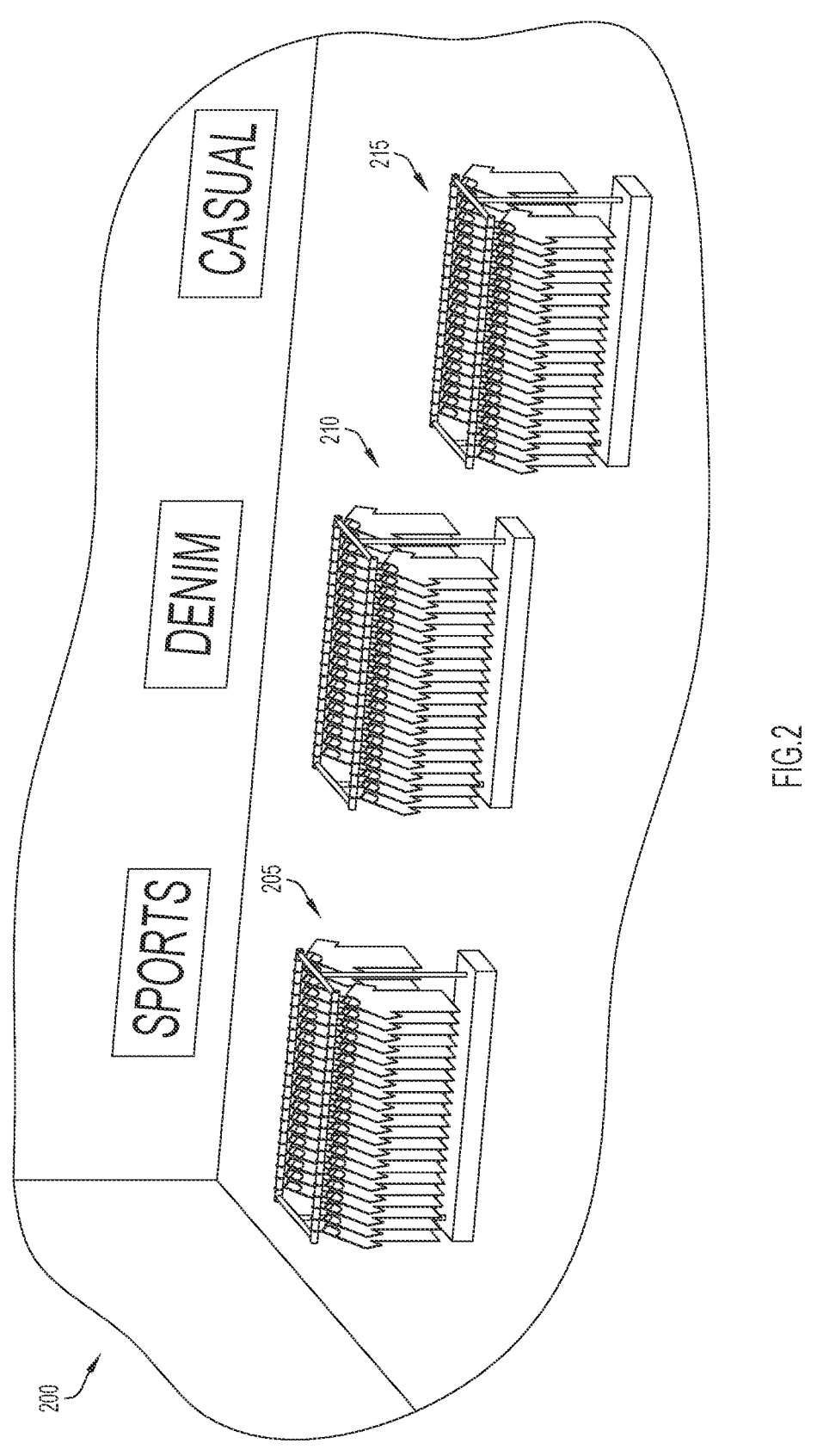
FIG. 2 is an illustration of an example virtual environment according to an embodiment of the present invention.

An example virtual environment according to an embodiment of the present invention is illustrated in FIG. 2. Initially, virtual environment 200 may be a virtual reality (VR) environment provided by an item provider (e.g., retailer, manufacturer, other entity providing goods and/or services, etc.). The virtual environment may be produced and processed by order processing code 200 and computer 101. By way of example, virtual environment 200 provides a VR view of a store environment. The store environment provides various articles of clothing for sale that are displayed on various structures (e.g., racks, tables, hangers, etc.). The articles of clothing may pertain to various categories (e.g., sports, denim, and casual as viewed in FIG. 2). However, the virtual environment may offer any products or services.

A user may select an article of clothing 205, 210, and/or 215 from a corresponding rack structure (e.g., via a mouse or other input mechanism), and the virtual environment may perform a look-up to provide information about the selected article of clothing for the user for rendering a purchasing decision. The user may add a desired article of clothing to a virtual cart of the virtual environment to purchase or order the article. In addition, the user may enter various information for the order (e.g., user name, user address, shipping address, payment information, etc.) to enable the virtual environment (and corresponding item provider (e.g., retailer, manufacturer, other entity providing goods and/or services, etc.) to fulfill the order in substantially the same manner described below.

The virtual environment may be implemented by any conventional or other virtual reality techniques. In addition, present invention embodiments may fulfill orders for any products or services of any type of computerized (or virtual) environments (e.g., augmented reality (AR), virtual reality (VR), network or web sites, etc.) in substantially the same manner described below.

Figure 3:
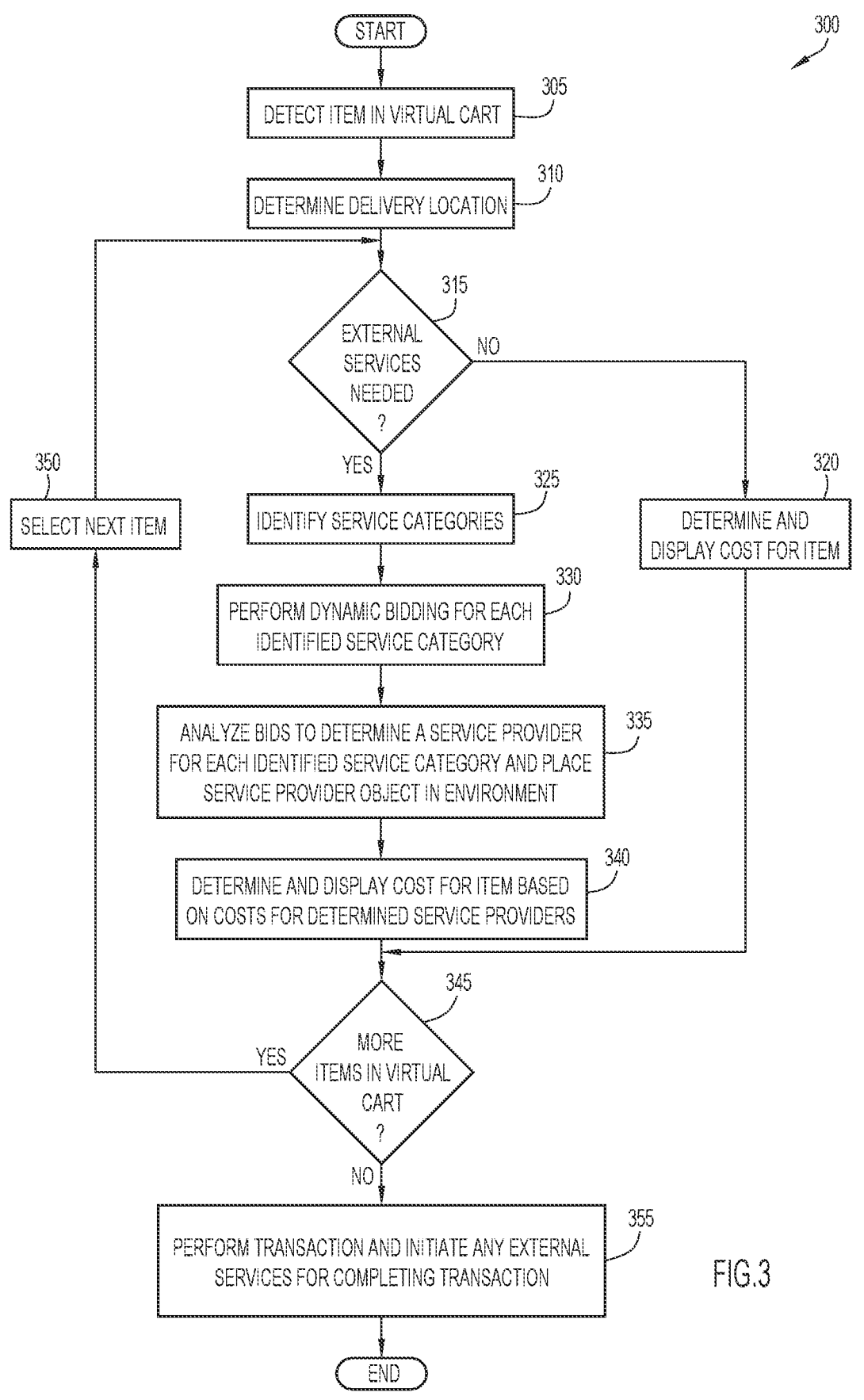
FIG. 3 is a procedural flowchart of a manner of fulfilling an order from a virtual environment according to an embodiment of the present invention.

A method 300 of fulfilling an order from a virtual environment (e.g., via order processing code 200 and computer 101, etc.) according to an embodiment of the present invention is illustrated in FIG. 3. Initially, an item provider (e.g., retailer, manufacturer, other entity providing goods and/or services, etc.) providing a virtual environment assesses consumers to identify geographic locations of the consumers or delivery, an ability to provide services for consumers in each geographic location, and services for which the item provider needs help from service providers for order fulfillment. The virtual environment is preferably a virtual reality (VR) environment, but may be any type of computerized (or virtual) environment (e.g., augmented reality (AR), virtual reality (VR), network or web sites, etc.).

Based on this assessment, the item provider (e.g., retailer, manufacturer, other entity providing goods and/or services, etc.) onboards one or more service providers for each identified service. The onboarding may include registering the service providers with the system (e.g., providing service provider information (e.g., a contact, communication information (e.g., message or email address, telephone number, etc.), etc.), and/or entering a contractual arrangement for services. For example, the item provider may onboard 10 different service providers for product sourcing, 3 different service providers for packing, etc. The service providers may be retailers, packers, couriers, and/or providers of other services for order fulfillment and operating locally to a geographic delivery location for a consumer.

The item provider (e.g., retailer, manufacturer, other entity providing goods and/or services, etc.) may consider its strategic objectives and key competitive advantages while onboarding to avoid any impact to its business (e.g., reduction of its market, etc.). By way of example, the item provider may choose to keep certain services that it considers as a competitive advantage in its own control to have an edge in the market (e.g., provide the certain services rather than onboarding a service provider to perform those services, enable or disable certain service providers in the system, etc.). For example, the item provider may choose to manage shipping and delivery to maintain confidentiality of the consumer.

A user may visit (e.g., via end user device 103, etc.) and browse a virtual environment (e.g., managed by order processing code 200 and computer 101, etc.) to purchase one or more items (e.g., product, service, etc.). The virtual environment is preferably a virtual reality (VR) environment, but may be any type of computerized (or virtual) environment (e.g., augmented reality (AR), virtual reality (VR), network or web sites, etc.) offering any types of items. A user may select and add one or more items to a virtual cart of the virtual environment to purchase or order the items. In addition, the user may enter various information for the order (e.g., user name, user address, shipping address, payment information, etc.) to enable the virtual environment (and corresponding item provider) to fulfill the order as described below.

Order processing code 200 detects an item in the virtual cart at operation 305, and determines a location for delivery of the item of the order at operation 310. The location may be a geographic location of a user that may be determined based on an Internet Protocol (IP) address of a user device (e.g., end user deice 103, etc.), an Internet of Things (IoT) device (e.g., a global positioning system (GPS) or other sensor, etc.), login credentials of the user for the virtual environment (e.g., the virtual environment may contain address information of the user, etc.), etc. Alternatively, order processing code 200 may determine a location based on a delivery address provided by the user (e.g., which may be for the user, another individual, an organizational entity, etc.).

Once the delivery location is determined, order processing code 200 ascertains information of the item provider (e.g., retailer, manufacturer, other entity providing goods and/or services, etc.) with respect to the delivery location to determine a capacity of the item provider to fulfill the order for the item at operation 315. In other words, the order processing code determines occurrence of conditions that indicate when additional or external services provided by service providers should be used to fulfill the order for the item. For example, the conditions for using external services may include when multiple users are shopping simultaneously and the item provider may run out of inventory to fulfill all the orders from the users, when the item provider may incur a cost higher than a set cost threshold to deliver the item to the delivery location (e.g., especially, when the delivery location is in a location across international borders, etc.), when the item provider may not be operating in the specified geographic region of the delivery location (e.g., but has consumers in the region who are interested in buying from them, etc.), and/or when the item provider may find that additional packing is required to deliver the item, additional transportation is required to deliver the item (e.g., by airplane, etc.), etc. which may impact the sustainability goals and carbon footprint goals set by the item provider.

Order processing code 200 may identify real-time stock or inventory of different products in different stores, and may employ historical learning to predict when bidding sessions are to be initiated (e.g., determine satisfaction of the conditions when external services should be used as described above). The order processing code may use any quantity or combination of conventional or other machine learning models (e.g., mathematical/statistical models, classifiers, feed-forward, recurrent or other neural networks, etc.) to identify when bidding sessions for services are to be initiated responsive to activity in the virtual environment. For example, order processing code 200 may employ predictive analytics models (e.g., Decision Trees, Random Forest, Gradient Boosting, etc.) to analyze historical data and identify patterns that indicate when bidding sessions for services are to be initiated. These models predict future scenarios based on past trends and enable informed decisions.

Further, order processing code 200 may employ reinforcement learning models (e.g., Deep Q-Networks (DQN), Proximal Policy Optimization (PPO), etc.) that learn optimal bidding strategies through trial and error. These models simulate different bidding scenarios within the virtual environment, and gradually improve their strategies over time to maximize partner participation.

Moreover, order processing code 200 may employ natural language processing (NLP) models (e.g., Bidirectional Encoder Representations from Transformers (BERT), Generative Pre-trained Transformer (GPT), etc.) that analyze textual information related to retail or other events and consumer interactions. By processing text from social media, customer reviews, or event descriptions, these models identify sentiment, trends, and user preferences that influence bidding decisions.

Order processing code 200 may also employ time series analysis models (e.g., Auto Regressive Integrated Moving Average (ARIMA), Long Short-Term Memory (LSTM), etc.) that analyze historical data with a temporal component. This helps understand seasonal trends, sales patterns, and demand fluctuations that impact the decision to participate in retail or other events of the virtual environment.

In addition, order processing code 200 may employ collaborative filtering models (e.g., Matrix Factorization, Neural Collaborative Filtering, etc.) that analyze user behaviors and preferences in the virtual environment. By recommending retail or other events and participation options based on similar user profiles, these models guide bidding decisions.

When the item provider (e.g., retailer, manufacturer, other entity providing goods and/or services, etc.) can fulfill the order for the item (e.g., no external services are needed, etc.) as determined at operation 315, order processing code 200 determines and displays the cost for the item in the virtual cart at operation 320. This may be accomplished by looking-up cost or price information for the item in a database (e.g., including any delivery or other costs associated with delivering the item, etc.).

When the item provider (e.g., retailer, manufacturer, other entity providing goods and/or services, etc.) cannot fulfill the order for the item (e.g., external services are needed, etc.) as determined at operation 315, order processing code 200 identifies the categories of the services to fulfill the order for the item at operation 325. For example, the service categories may include sourcing, packing, courier, etc. This may be accomplished by comparing services provided by the item provider with services for fulfillment of the order for the item. The services for delivery of the item may be stored in a database.

Order processing code 200 initiates a dynamic, real-time bidding session for each identified service category associated with the delivery location at operation 330. The item provider (e.g., retailer, manufacturer, other entity providing goods and/or services, etc.) may choose to keep some of its strategic functions within its control and not initiate bidding for those services. By way of example, the item provider may choose to keep certain services that it considers as a competitive advantage in its own control to have an edge in the market (e.g., provide the certain services rather than enabling a service provider to perform those services, enable or disable certain service providers in the system, etc.). For example, the item provider may choose to manage shipping and delivery to maintain confidentiality of the consumer.

Once the service providers have bid for the services, order processing code 200 analyzes the bids to determine a service provider for each identified service category for which a bidding session was initiated at operation 335. This determination may consider for each service category the dynamic bids received (e.g., based on cost and additional services provided (e.g., insurance, etc.)), data analysis of historic delivery data (e.g., on-time delivery, returned products, etc.), and/or data analysis of historic customer feedback. For example, the item provider (e.g., retailer, manufacturer, other entity providing goods and/or services, etc.) may provide weights for these factors, where each factor may be represented by a numeric metric that is applied to a weight to produce an overall score (e.g., sum of weighted metrics, etc.). The weight may correspond to preferences of the item provider (e.g., greater significance to delivery time, fewer returns, positive customer feedback, etc.). The service provider associated with a highest score may be selected for a corresponding service category.

Further, order processing code 200 may employ any quantity or combination of conventional or other machine learning models (e.g., mathematical/statistical models, classifiers, feed-forward, recurrent or other neural networks, etc.) to determine the service provider. For example, the order processing code may use one or more of the machine learning models described above to assess attributes (e.g., the quality of service, costs and delivery timelines based on historic data and current social/political/geographical scenario (e.g., political protests, natural disaster, etc.) at the delivery location, etc.) to identify an appropriate bid for a particular order.

In addition, a determined service provider for a service category may place an object (e.g., avatar-based helpdesk or other object, etc.) in the virtual environment at operation 355 to interact or communicate with the user and provide appropriate assistance for a purchase. This may be accomplished by an application programming interface (API) enabling the service provider to provide the object and interact in the virtual environment.

Once the service providers are determined, order processing code 200 determines a cost for the item to be delivered to the delivery location at operation 340, and displays the cost for the item in the virtual cart. The cost may be determined based on the cost of the item and costs for external services indicated in the corresponding selected bids (e.g., sum of costs for the item and associated services, etc.).

After an item is processed (e.g., from operation 320 or 340), order processing code 200 determines a presence of another item in the virtual cart. When another item is present in the virtual cart as determined at operation 345, a next item from the virtual cart is selected at operation 350 and the above process is repeated for the next item from operation 315 as described above.

Once the items in the virtual cart are processed as determined at operation 345, order processing code 200 performs the transaction (e.g., in response to user authorization) at operation 355. For example, order processing code 200 may process the payment and initiate the services (e.g., of the item provider, service providers, etc.) to fulfill delivery of the items of the order. By way of example, the order processing code may generate and send controls to automated systems of the item provider (e.g., retailer, manufacturer, other entity providing goods and/or services, etc.) or service provider, to retrieve, pack, and/or send an item of the order (e.g., automated inventory system, automated packing system, automated shipping system, etc.).

Figure 4:
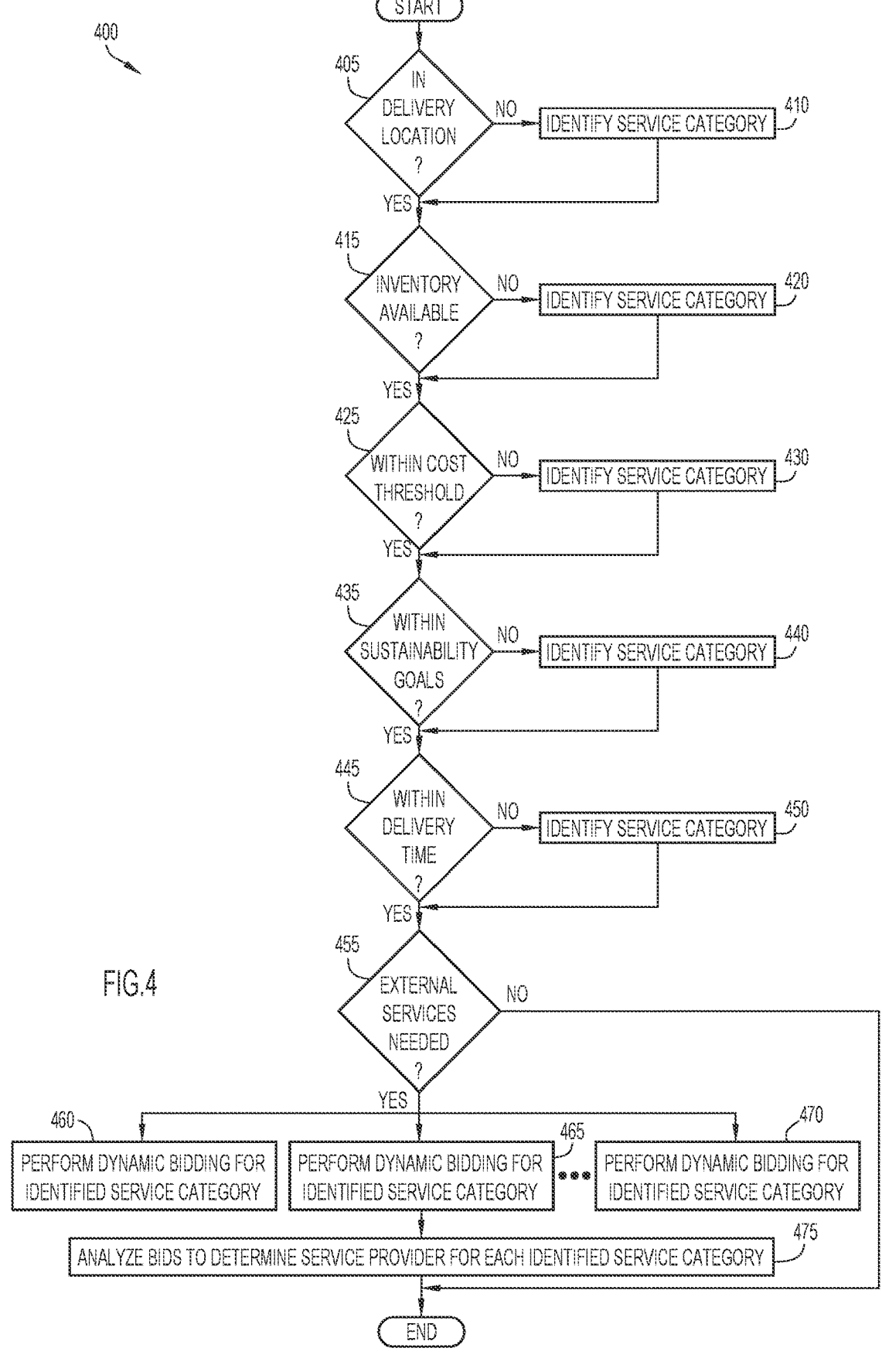
FIG. 4 is a procedural flowchart of a manner of dynamically bidding for service providers for order fulfillment according to an embodiment of the present invention.

A method 400 of dynamically bidding for service providers for order fulfillment (e.g., via order processing code 200 and computer 101, etc.) according to an embodiment of the present invention is illustrated in FIG. 4. Method 400 may correspond to operations 315, 325, 330, and 335 of FIG. 3. Initially, a user may visit (e.g., via end user device 103, etc.) and browse a virtual environment (e.g., managed by order processing code 200 and computer 101, etc.) to purchase one or more items (e.g., product, service, etc.) as described above. The virtual environment is preferably a virtual reality (VR) environment, but may be any type of computerized (or virtual) environment (e.g., augmented reality (AR), virtual reality (VR), network or web sites, etc.) offering any types of items. The user may select and add one or more items to a virtual cart of the virtual environment to purchase or order the items, and enter various information for the order (e.g., user name, user address, shipping address, payment information, etc.) to enable the virtual environment (and corresponding item provider) to fulfill the order as described above. Order processing code 200 detects an item in the virtual cart and determines a location for delivery of the item of the order as described above (e.g., a geographic location of a user; a shipping address for the user, another individual, an organizational entity; etc.).

Once the delivery location is determined, order processing code 200 ascertains information of the item provider (e.g., retailer, manufacturer, other entity providing goods and/or services, etc.) with respect to the location of the user to determine a capacity of the item provider to fulfill the order for the item. In other words, the order processing code determines additional or external services provided by service providers that may be used to fulfill the order for the item.

In particular, order processing code 200 determines whether or not the item provider (e.g., retailer, manufacturer, other entity providing goods and/or services, etc.) operates or has a presence in the area of the delivery location at operation 405. The area may be defined by a distance from the delivery location (e.g., a threshold distance, a threshold radius, etc.). This may be accomplished by comparing data of the item provider locations in a database with the delivery location for the order.

Further, a conventional or other machine learning model may be employed (e.g., time series analysis models, predictive analytics models, etc.) to predict activity (e.g., sales or purchases) at locations where the item provider (e.g., retailer, manufacturer, other entity providing goods and/or services, etc.) does not operate. The item provider may visualize a surge in activity (e.g., sales or purchases) based on a festival or event at different locations. This information may be provided to relevant onboarded service providers to prepare for the surge in activity and bidding.

The machine learning model may be implemented by any conventional or other machine learning models (e.g., mathematical/statistical models, classifiers, feed-forward, recurrent or other neural networks, etc.). For example, neural networks may include an input layer, one or more intermediate layers (e.g., including any hidden layers), and an output layer. Each layer includes one or more neurons, where the input layer neurons receive input (e.g., actual data, feature vectors derived from the actual data, etc.), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, a machine learning model may be trained with a training set of actual data or features derived from the actual data, where the neural network attempts to produce the provided or known data and uses an error from the output (e.g., difference between inputs and outputs) to adjust weight (and bias) values. The output layer of the neural network indicates a corresponding prediction (e.g., of sales, etc.) for input data. By way of example, the output layer neurons may indicate a specific amount of activity (e.g., sales or purchases, etc.) or a change in activity (and a probability or confidence).

The machine learning model may be trained with data of various locations with known amounts or changes in activity (e.g., sales or purchases, etc.) in response to events. Information concerning the delivery and other locations are provided to the machine learning model to predict the activity or change in activity.

When the item provider (e.g., retailer, manufacturer, other entity providing goods and/or services, etc.) is not within the area of the delivery location as determined at operation 405, a service category for fulfilling the order is identified at operation 410 (e.g., product sourcing, courier, etc.). Service categories may be mapped to corresponding conditions (e.g., not operating in an area of a delivery location, lack of inventory, cost threshold, sustainability threshold, inability to meet a requested delivery time, etc.), where mapped service categories may be compared to service categories of the item provider to identify the service category for the order.

Order processing code 200 determines a presence of available inventory of the item provider (e.g., retailer, manufacturer, other entity providing goods and/or services, etc.)

for the order at operation 415. The level of inventory (or quantity of items) may be ascertained from a computerized inventory system or database, or from Internet of Things (IoT) or other sensing devices (e.g., image capture device or camera, weight sensor, RFID tagging, etc.) sensing items in a storage location (e.g., shelves, etc.).

Further, a conventional or other machine learning model may be employed (e.g., predictive analytics models, etc.) to predict an unavailability scenario at a particular location based on historic data. This information may be provided to service providers onboarded for product sourcing services to prepare in advance for bidding and fulfilling the order.

The machine learning model may be implemented by any conventional or other machine learning models (e.g., mathematical/statistical models, classifiers, feed-forward, recurrent or other neural networks, etc.). For example, the neural network described above may be used to predict inventory unavailability (e.g., an amount or change in inventory, etc.). The machine learning model may be trained with historic data with known changes in inventory over time and/or in response to events. Information concerning current inventory and/or conditions are provided to the machine learning model to predict the amount or change in inventory.

When the item provider (e.g., retailer, manufacturer, other entity providing goods and/or services, etc.) does not have sufficient inventory as determined at operation 415, a service category for fulfilling the order is identified at operation 420 (e.g., product sourcing, etc.). Service categories may be mapped to corresponding conditions (e.g., not operating in an area of a delivery location, lack of inventory, cost threshold, sustainability threshold, inability to meet a requested delivery time, etc.), where mapped service categories may be compared to service categories of the item provider to identify the service category for the order as described above.

Order processing code 200 determines when the item provider (e.g., retailer, manufacturer, other entity providing goods and/or services, etc.) may incur a cost higher than a cost threshold to deliver the item to the delivery location at operation 425. This may occur when the delivery location is in a location across international borders. Cost information (e.g., shipping, packing, etc.) may be ascertained from a database to determine the cost for delivery of the item.

Further, a conventional or other machine learning model may be employed (e.g., time series analysis models, predictive analytics models, reinforcement learning models, etc.) to simulate scenarios based on availability of logistics services (and cross-border taxes, if applicable) in real-time to determine logistics cost. This is further compared with an acceptable cost threshold (at operation 425) before deciding to initiate bidding for logistics services with partners or service providers.

The machine learning model may be implemented by any conventional or other machine learning models (e.g., mathematical/statistical models, classifiers, feed-forward, recurrent or other neural networks, etc.). For example, the neural network described above may be used to determine logistics cost. The machine learning model may be trained with various scenarios with known costs (e.g., types of services, costs, delivery locations, etc.). Information concerning a current scenario (e.g., types of services, delivery locations, etc.) is provided to the machine learning model to determine the logistics cost.

When the cost exceeds the cost threshold as determined at operation 425, a service category for fulfilling the order is identified at operation 430 (e.g., courier, etc.). Service categories may be mapped to corresponding conditions (e.g., not operating in an area of a delivery location, lack of inventory, cost threshold, sustainability threshold, inability to meet a requested delivery time, etc.), where mapped service categories may be compared to service categories of the item provider (e.g., retailer, manufacturer, other entity providing goods and/or services, etc.) to identify the service category for the order as described above.

Order processing code 200 determines when delivery of the item does not satisfy sustainability goals (e.g., a carbon emission threshold, etc.) at operation 435. For example, the item provider (e.g., retailer, manufacturer, other entity providing goods and/or services, etc.) may find that additional services for delivery of the item (e.g., additional packing, additional transportation (e.g., by airplane, etc.), etc.) may impact sustainability goals and carbon footprint goals (e.g., amount of carbon emissions, etc.) set by the item provider. The sustainability or carbon footprint information may be ascertained from a database or other information source to determine metrics for the sustainability or carbon footprint goals.

Further, a conventional or other machine learning model may be employed (e.g., time series analysis models, predictive analytics models, reinforcement learning models, etc.) to determine the carbon footprint based on the availability of logistics services in real-time. This may be compared with an acceptable carbon emission threshold (at operation 435) before deciding to initiate the bidding for product sourcing, packing and logistics services with service providers.

The machine learning model may be implemented by any conventional or other machine learning models (e.g., mathematical/statistical models, classifiers, feed-forward, recurrent or other neural networks, etc.). For example, the neural network described above may be used to determine the carbon footprint (e.g., an amount of carbon emissions, etc.). The machine learning model may be trained with various scenarios with known carbon footprints (e.g., types of services, amount of carbon emissions, delivery locations, etc.). Information concerning a current scenario (e.g., types of services, delivery locations, etc.) is provided to the machine learning model to determine the carbon footprint.

When delivery of the item does not satisfy the sustainability or carbon footprint goals (e.g., does not satisfy the carbon emission threshold, etc.) as determined at operation 435, a service category for fulfilling the order is identified at operation 440 (e.g., packing, courier, etc.). Service categories may be mapped to corresponding conditions (e.g., not operating in an area of a delivery location, lack of inventory, cost threshold, sustainability threshold, inability to meet a requested delivery time, etc.), where mapped service categories may be compared to service categories of the item provider (e.g., retailer, manufacturer, other entity providing goods and/or services, etc.) to identify the service category for the order as described above.

Order processing code 200 determines when the item provider (e.g., retailer, manufacturer, other entity providing goods and/or services, etc.) cannot provide the item by a requested delivery time (e.g., date, specific time, etc.) at operation 445. For example, the item provider may find that additional services for delivery of the item (e.g., additional packing, additional transportation (e.g., by airplane, etc.), etc.) may be required in order to provide delivery for the item by the requested delivery time. The delivery information may be ascertained from a database or other information source to determine timelines for delivery of the item (e.g., retrieving, packing, shipping, etc.).

Further, a conventional or other machine learning model may be employed (e.g., time series analysis models, predictive analytics models, etc.) to determine the delivery time (e.g., date, specific time, etc.) for the item based on historic data (e.g., conditions, item, delivery time, etc.). The delivery time may be compared to the requested delivery time (at operation 445) to determine compliance with the requested delivery time (e.g., date, specific time, etc.) by the item provider.

The machine learning model may be implemented by any conventional or other machine learning models (e.g., mathematical/statistical models, classifiers, feed-forward, recurrent or other neural networks, etc.). For example, the neural network described above may be used to determine the delivery time (e.g., date, specific time, etc.). The machine learning model may be trained with various scenarios with known delivery times (e.g., types of services, items, delivery locations, etc.). Information concerning a current scenario (e.g., types of services, items, delivery locations, etc.) is provided to the machine learning model to determine the delivery time.

When delivery of the item does not satisfy the requested delivery time (e.g., date, specific time, etc.) as determined at operation 445, a service category for fulfilling the order is identified at operation 450 (e.g., packing, courier, etc.). Service categories may be mapped to corresponding conditions (e.g., not operating in an area of a delivery location, lack of inventory, cost threshold, sustainability threshold, inability to meet a requested delivery time, etc.), where mapped service categories may be compared to service categories of the item provider (e.g., retailer, manufacturer, other entity providing goods and/or services, etc.) to identify the service category for the order as described above.

When one or more service categories are identified (e.g., external services are needed to fulfill the order, etc.) as determined at operation 455, order processing code 200 initiates and conducts multiple dynamic bidding sessions (e.g., operations 460, 465, and/or 470) each for a corresponding identified service category. The bidding sessions are preferably in real-time and may be implemented in parallel. For example, order processing code 200 may identify the service providers associated with a service category and conduct a dynamic bidding session. The bidding session may be accomplished by sending notification to the associated service providers. The notification may include information pertaining to delivery of the item (e.g., dimensions, weight, delivery location, delivery time, etc.). The service providers receive the notification and return corresponding bid information (e.g., cost of service, expected completion time, etc.). The bid information may be provided automatically by a service provider computing system (or database system) that can process the notification information and produce and return the bid information. Alternatively, the bid information may be produced manually by an associate of the service provider.

The item provider (e.g., retailer, manufacturer, other entity providing goods and/or services, etc.) may consider its strategic objectives and key competitive advantages while identifying service categories to avoid any impact to its business (e.g., reduction of its market, etc.). By way of example, the item provider may choose to keep certain services that it considers as a competitive advantage in its own control to have an edge in the market (e.g., provide the certain services rather than allowing a service provider to perform those services, enable or disable certain service providers in the system, etc.). For example, the item provider may choose to manage shipping and delivery to maintain confidentiality of the consumer. In this case, the item provider may control from which service categories to elicit bids (e.g., order processing code may enable or disable bidding for service categories, etc.).

Once bids for the service categories are received, order processing code 200 analyzes the bids to determine a service provider for each identified service category for which a bidding session was initiated at operation 475. The order processing code may provide a time-out or certain time interval to receive bids for consideration (e.g., service providers providing no response or a response after the time interval are not considered for providing the service, etc.). The determination of service providers may consider factors for each service category including the dynamic bids received (e.g., based on cost and additional services provided (e.g., insurance, etc.)), data analysis of historic delivery data (e.g., on-time delivery, returned products, etc.), and/or data analysis of historic customer feedback. The item provider (e.g., retailer, manufacturer, other entity providing goods and/or services, etc.) may provide weights for these factors, where each factor may be represented by a numeric metric that is applied to a weight to produce an overall score (e.g., sum of weighted metrics, etc.). The weight may correspond to preferences of the item provider (e.g., greater significance to delivery time, fewer returns, positive customer feedback, etc.). The service provider associated with a highest score may be selected for a corresponding service category.

Further, a conventional or other machine learning model may be employed by order processing code 200 (e.g., time series analysis models, predictive analytics models, reinforcement learning models, etc.) to determine a service provider based on the bids. The machine learning model may be implemented by any quantity or combination of conventional or other machine learning models (e.g., mathematical/statistical models, classifiers, feed-forward, recurrent or other neural networks, etc.). For example, the order processing code may use one or more of the machine learning models described above to assess attributes (e.g., the quality of service, costs and delivery timelines based on historic data and current social/political/geographical scenario (e.g., political protests, natural disaster, etc.) at the delivery location, etc.) to identify an appropriate bid for a particular order.

For example, the neural network described above may be used to determine the appropriate service provider. The machine learning model may be trained with various scenarios (e.g., cost and additional services provided (e.g., insurance, etc.), data analysis of historic delivery data (e.g., on-time delivery, returned products, etc.), data analysis of historic customer feedback, costs, etc.) with known optimal bids (or service providers). Information concerning current bids (e.g., cost and additional services provided (e.g., insurance, etc.), data analysis of historic delivery data (e.g., on-time delivery, returned products, etc.), data analysis of historic customer feedback, costs, etc.) for a service category is provided to the machine learning model to determine the appropriate service provider for that service category.

Once the service providers are determined, order processing code 200 determines a cost for the item to be delivered to the delivery location (e.g., based on the costs of the item and associated services, etc.) and proceeds to fulfill the order in substantially the same manner described above.

Present invention embodiments may provide various technical and other advantages. In an embodiment, bidding may be performed dynamically on an on-demand or as needed basis and in real-time to perform order processing. This enables orders to be dynamically analyzed and updated in real-time. Further, the machine learning models may be continuously updated (or trained) based on user feedback (e.g., preferences for bid selection, types of services needed, etc.) and/or new activity (e.g., sales or purchases). For example, user feedback (e.g., preferences, etc.) and/or new activity may indicate desired services or criteria. This information may be used to update or train the machine learning models with new or different training data (e.g., derived from attributes of the new information, etc.) to enable dynamic determination of conditions, services, and/or bids. Thus, the machine learning models may continuously evolve (or be trained) to learn characteristics of bidding conditions, bids, and/or services for dynamically changing determinations of these and/or improve accuracy or compliance for order processing.

It will be appreciated that the embodiments described above and illustrated in the drawings represent only a few of the many ways of implementing embodiments for virtual environment with dynamic bidding for services to process an order.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system. These systems may include any types of monitors and input devices (e.g., keyboard, mouse, voice recognition, etc.) to enter and/or view information.

It is to be understood that the software of the present invention embodiments (e.g., order processing code, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., orders, costs, service providers, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

A report may include any information arranged in any fashion, and may be configurable based on rules or other criteria to provide desired information to a user (e.g., orders, costs, service providers, etc.).

The present invention embodiments are not limited to the specific tasks or algorithms described above, but may be utilized for processing any types of orders for any items (e.g., goods, services, etc.) from any computerized environment (e.g., virtual environment, network site, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of processing an order in a computerized environment, the computer-implemented method comprising:

identifying, via at least one processor, an item selected by a user in the computerized environment;

determining, via the at least one processor, that a provider of the item is unable to provide the item to a delivery location based on one or more conditions;

determining, via the at least one processor, a plurality of service categories for the item based on the determining that the provider of the item is unable to provide the item;

executing, via the at least one processor, a plurality of dynamic bidding sessions in a virtual reality (VR) environment, wherein the computerized environment comprises the VR environment, the plurality of dynamic bidding sessions is executed for a plurality of service providers to select one or more service providers of the plurality of service providers, one or more services associated with the selected one or more service providers enable provision of the item to the delivery location, and each dynamic bidding session of the plurality of dynamic bidding sessions is associated with a respective service category of the plurality of service categories;

generating, via the at least one processor, a graphical object within the VR environment based on the executing of the plurality of dynamic bidding sessions, wherein the graphical object is associated with the selected one or more service providers, the graphical object provides virtual assistance for the processing of the order, and the graphical object enables interaction between the user and the selected one or more service providers; and performing, via the at least one processor based on the generating of the graphical object, a transaction for the item to deliver the item to the delivery location via the provider of the item and the selected one or more service providers.

2. The computer-implemented method of claim 1, wherein the determining that the provider of the item is unable to provide the item to the delivery location comprises:

determining that the provider of the item does not operate in an area of the delivery location.

3. The computer-implemented method of claim 1, wherein the determining that the provider of the item is unable to provide the item to the delivery location comprises:

determining that the provider of the item lacks inventory for the item.

4. The computer-implemented method of claim 1, wherein the determining that the provider of the item is unable to provide the item to the delivery location comprises:

determining that a cost for the provider of the item to deliver the item to the delivery location fails to satisfy a cost threshold.

5. The computer-implemented method of claim 1, wherein the determining that the provider of the item is unable to provide the item to the delivery location comprises:

determining that delivery of the item to the delivery location by the provider of the item fails to satisfy a carbon emission threshold.

6. The computer-implemented method of claim 1, wherein determining that the provider of the item is unable to provide the item to the delivery location comprises:

determining that the provider of the item is unable to deliver the item to the delivery location by a requested delivery time.

7. A system for processing an order in a computerized environment comprising:

one or more memories; and at least one processor coupled to the one or more memories and configured to:

identify an item selected by a user in the computerized environment;

determine that a provider of the item is unable to provide the item to a delivery location based on one or more conditions;

determine a plurality of service categories for the item based on the determination that the provider of the item is unable to provide the item;

execute a plurality of dynamic bidding sessions in a virtual reality (VR) environment, wherein the computerized environment comprises the VR environment, the plurality of dynamic bidding sessions is executed for a plurality of service providers to select one or more service providers of the plurality of service providers, one or more services associated with the selected one or more service providers enable provision of the item to the delivery location, and each dynamic bidding session of the plurality of dynamic bidding sessions is associated with a respective service category of the plurality of service categories;

generate a graphical object within the VR environment based on the execution of the plurality of dynamic bidding sessions, wherein the graphical object is associated with the selected one or more service providers, the graphical object provides virtual assistance for the processing of the order, and the graphical object enables interaction between the user and the selected one or more service providers; and perform, based on the generation of the graphical object, a transaction for the item to deliver the item to the delivery location via the provider of the item and the selected one or more service providers.

8. The system of claim 7, wherein the determination that the provider of the item is unable to provide the item to the delivery location comprises one or more from a group of:

determination that the provider of the item does not operate in an area of the delivery location;

determination that the provider of the item lacks inventory for the item; and determination that the provider of the item is unable to deliver the item to the delivery location by a requested delivery time.

9. The system of claim 7, wherein the determination that the provider of the item is unable to provide the item to the delivery location comprises:

determination that a cost for the provider of the item to deliver the item to the delivery location fails to satisfy a cost threshold.

10. The system of claim 7, wherein the determination that the provider of the item is unable to provide the item to the delivery location comprises:

determination that delivery of the item to the delivery location by the provider of the item fails to satisfy a carbon emission threshold.

11. A computer program product for processing an order in a computerized environment, the computer program product comprising one or more computer readable storage media having program instructions collectively stored on the one or more computer readable storage media, the program instructions executable by at least one processor to cause the at least one processor to:

identify an item selected by a user in the computerized environment;

determine that a provider of the item is unable to provide the item to a delivery location based on one or more conditions;

determine a plurality of service categories for the item based on the determination that the provider of the item is unable to provide the item;

execute a plurality of dynamic bidding sessions in a virtual reality (VR) environment, wherein the computerized environment comprises the VR environment, the plurality of dynamic bidding sessions is executed for a plurality of service providers to select one or more service providers of the plurality of service providers, one or more services associated with the selected one or more service providers enable provision of the item to the delivery location, and each dynamic bidding session of the plurality of dynamic bidding sessions is associated with a respective service category of the plurality of service categories;

generate a graphical object within the VR environment based on the execution of the plurality of dynamic bidding sessions, wherein the graphical object is associated with the selected one or more service providers, the graphical object provides virtual assistance for the processing of the order, and the graphical object enables interaction between the user and the selected one or more service providers; and perform, based on the generation of the graphical object, a transaction for the item to deliver the item to the delivery location via the provider of the item and the selected one or more service providers.

12. The computer program product of claim 11, wherein the determination that the provider of the item is unable to provide the item to the delivery location comprises one or more from a group of:

determination that the provider of the item does not operate in an area of the delivery location;

determination that the provider of the item lacks inventory for the item; and determination that the provider of the item is unable to deliver the item to the delivery location by a requested delivery time.

13. The computer program product of claim 11, wherein the determination that the provider of the item is unable to provide the item to the delivery location comprises:

determination that a cost for the provider of the item to deliver the item to the delivery location fails to satisfy a cost threshold.

14. The computer program product of claim 11, wherein the determination that the provider of the item is unable to provide the item to the delivery location comprises:

determination that delivery of the item to the delivery location by the provider of the item fails to satisfy a carbon emission threshold.

\* \* \* \* \*